Jan. 11, 1944. J. T. CONNELLY ET AL 2,339,152

HYDROSTATICAL WEIGHING APPARATUS

Filed Sept. 9, 1941 2 Sheets-Sheet 2

Patented Jan. 11, 1944

2,339,152

UNITED STATES PATENT OFFICE 2,339,152

HYDROSTATICAL WEIGHING APPARATUS

John T. Connelly, Washington, Ind., and Frank L. Hall, Cincinnati, Ohio

Application September 9, 1941, Serial No. 410,190

3 Claims. (Cl. 265—47)

This invention relates to improvements in hydrostatical weighing apparatus, primarily for determining separately the weight carried by each of a pair of wheels of a locomotive or vehicle, and the weight they carry conjointly, for the purpose of ascertaining the amount or degree that the vehicle is out of equilibrium and for the aid and guide in making a necessary correction.

In the operation of a locomotive, wear and other factors result in throwing the same out of balance, which materially lessens the tractive power of the drive wheels, causing hard riding, cutting of the tires, and excessive swinging at high speeds. An unbalanced condition may also distribute too much weight on the engine truck and trailers, cause heated journals, and many other damaging factors on all parts of the locomotive.

There usually is a schedule for each locomotive, showing originally the weight on the drivers, engine truck and trailers, although in making repairs, the standards can not always be maintained as the springs employed may vary so as not to draw the same weight, and under the practice heretofore followed in making repairs and corrections nothing definite was offered to reestablish the balance. The present improvement provides for determining the weight carried by each wheel or a pair jointly, and therefore provides a method of determining the degree of unbalance, and from which it is possible to make the necessary and accurate corrections.

An object of the invention is to provide a weighing apparatus for determining the weight carried on each pair of wheels of a locomotive or vehicle, and that upon each wheel of a pair with all of the wheels of the vehicle on a common track level or plane, and primarily by means actuated by pressure for sustaining the pair of wheels being weighed, and thereby obtaining the degree of pressure administered when sustaining the pair of wheels at the common track level.

Various other features and advantages of the invention will be more fully apparent from a description of the accompanying drawings, in which.

Figure 1:
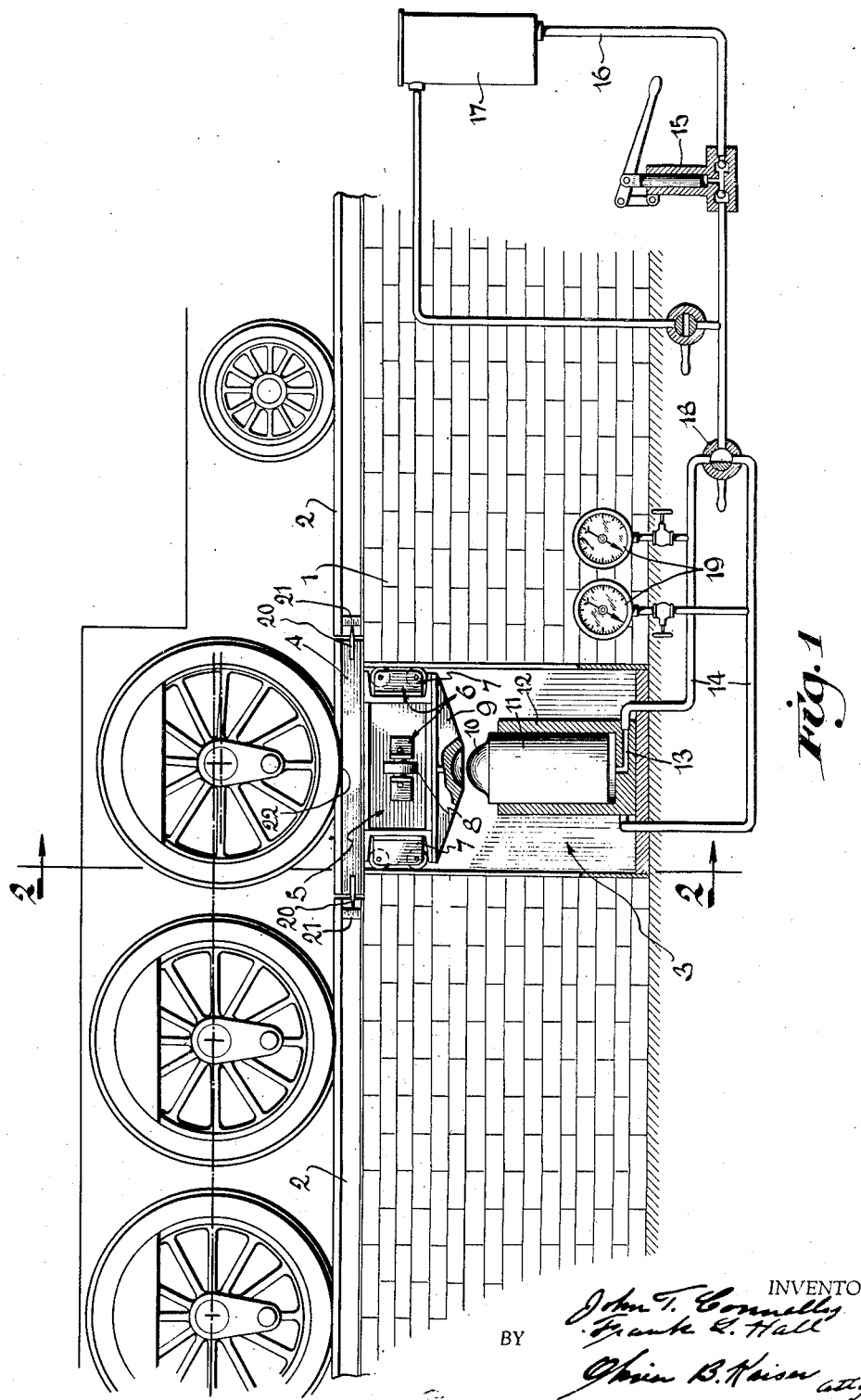
Figure 1 is an end elevation of the improved weighing apparatus disposed in a pit below the plane of a railway track.
Figure 2:
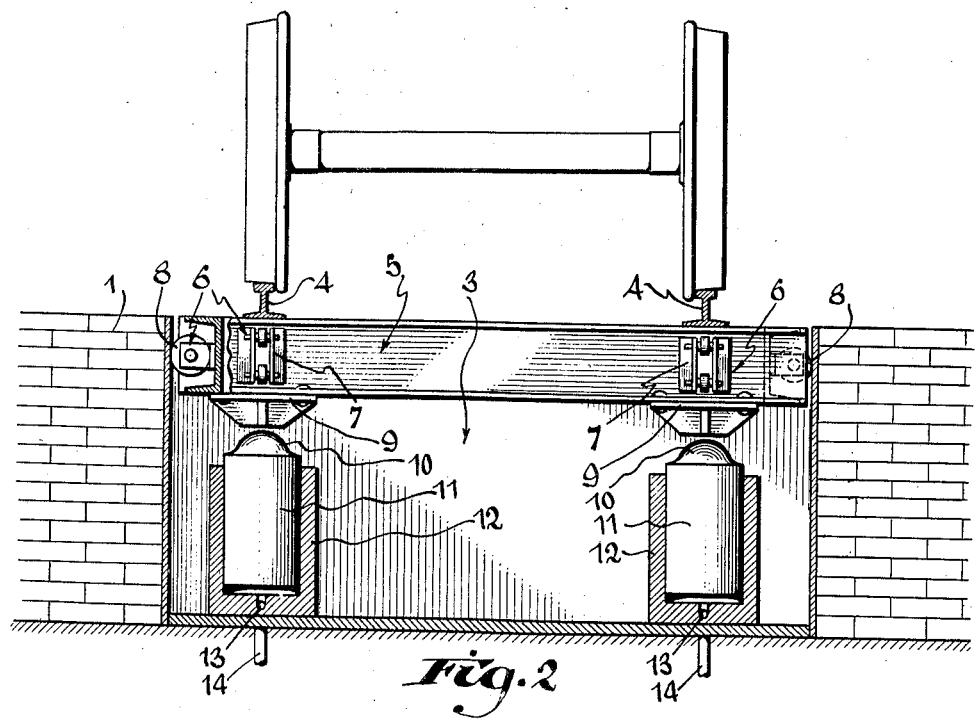
Figure 2 is a section on line 2—2, Figure 1.

Referring to the drawings, 1 indicates a suitable foundation for firmly sustaining a given length of railway track 2, and to provide a pit 3 beneath a track section 4 of sufficient span for stationing a single pair or set of wheels or drivers of a locomotive thereon while the remaining wheels of the vehicle bear upon the stable portion of the railway track. The track section 4 longitudinally is of a length preferably to span the width of the pit, so that its opposite ends normally bear and are sustained upon the foundation in alignment and elevation with the stationary stable portion of the railway track.

The track section or rails 4 are mounted upon a carriage 5 as a rectangular frame of channel iron construction, guidingly sustained in the pit by a plurality of roller units 6. The roller units for the side of the carriage are each arranged in a pair of aligned and adequately spaced rollers, journalled within a bracket 7 fixed to the side wall of the carriage, the rollers contacting and travelling upon a vertical guide plate, rail or wall of the pit.

A single guide roller 8 is provided for each of the opposite ends of the carriage located centrally thereof. The rollers stabilize the carriage and maintain the same in a horizontal plane in its lifting travel. A pair of bearing plates 9 are fixed to the underside of the carriage respectively toward the opposite ends thereof, each centrally at its underside as a concavity therein for engagement with and seating a semispherical head 10 of a ram or plunger 11, movable vertically within a cylinder 12.

The base of the cylinder is provided with a port 13 in communication with a pressure supply conduit 14 leading to a pump 15. The pump is diagrammatically illustrated, and in a conventional form preferably of hand operated type. The design of pump structure is optional, and may be power driven, although a hand operated type is more conveniently controlled.

The pump intake, through a conduit 16, connects with a fluid supply tank 17. The conduit line 14 has a control valve 18 interposed therein, which likewise serves in the capacity of a manifold to branch the supply line for individually accommodating both cylinders from a single pump, although a separate pump may be employed for each cylinder. The supply line for each cylinder or ram has a pressure gauge 19 interposed therein for separately indicating the lifting pressure of each ram. Each movable rail section 4 has an indicator or pointer 20 extending horizontally from each of its opposite ends fixed intermediately to the web of the rail, with its free projecting end pointed for registering with a linear measuring scale 21 fixed to the web of the joining stationary rail for indicating the degree of carriage lift.

Figure 3:
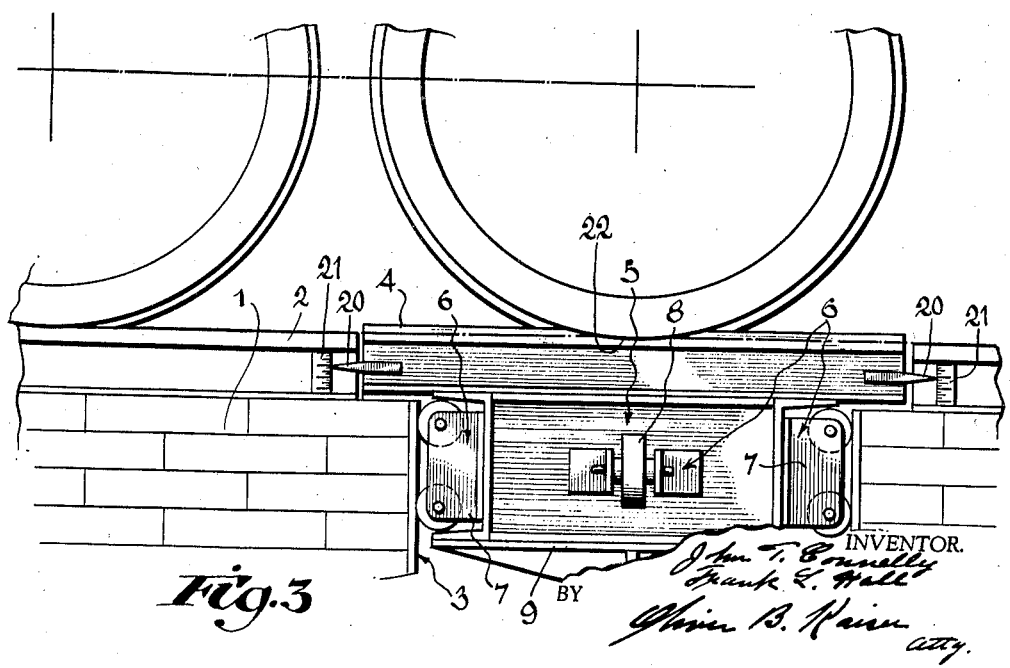
Figure 3 is an enlarged end elevation of the weighing carriage in an elevated position embodying a section of a railroad track sufficient for sustaining a pair or set wheels or drivers of a locomotive.

The track section or rails 4 each centrally of its length and coaxially with the ram has a concavity or recess 22 cut into the top head portion of the rail, preferably of a radius to slightly more than accommodate the diameter of the largest size of locomotive driver. Each set or pair of wheels to be weighed is seated in the concavity to present them normally below the plane of the stationary rails or track 2. This brings a line tangent to the base of the cavity below the plane of the tops of the stationary rails or track and the degree governs the elevating height to which the carrier is brought in weighing. The weight measurement is computed by the degree of the pressure necessary to elevate the wheels and their load to bring a line horizontally tangent to the base of the concavity, in plane with the top of the stationary rails or track 2 as indicated in the dot and dash line, Figure 3. This brings all of the wheels of the locomotive to the same level.

It is a general railroad practice to provide a drawing print indicating the initial weight of each locomotive and its tender or trailer. This schedule indicates the weight of each pair of drivers, the front truck wheels and total weight on the drivers. Likewise, each set of trailer or tender wheels and total weight of the tender is indicated. This schedule is an engineering set-up to obtain good engine riding, proper tractive power, and to avoid heated bearings and an unequal weight that would cause breakage of parts.

Under the prevailing practice, the weighing of locomotives after the engine has been in service has been by the use of the conventional weighing apparatus or scales, for obtaining total weight. The method employed is to first advance the engine truck wheels upon one end of the scales, to take the weight thereof. The locomotive is then advanced to bring the front drivers additionally upon the scales for weighing. The first truck weight is then subtracted from the combined weight of the truck and drivers, thus indicating the weight on drivers. This procedure is continued progressively, adding a second pair of wheels each time, and from the weight figures subtracting the previous weight result, until the total weight is taken. This is followed in a similar manner in moving the locomotive off of the scales, the forward truck wheels first, then subtracting the weight result from the total, following in the reverse order from that when the locomotive is moved onto the scales. As there is a variance in the weight measurements taken in moving the locomotive onto the scales from that taken in moving off of the scales, the difference is averaged. This procedure has never been successful or reliable as each time the locomotive is put onto the scale a different weight on the drivers is obtained.

There are numerous causes which effect an out-of-weight condition on the drivers, as for instance, turning down the treads of the engine truck wheels for truing; or worn centering arrangements on engine trucks; weak engine truck springs; worn spring equalizers and pins; end springs out of alignment. In making repairs, effort is made to equalize proportionately, but at best this has been only approximated. With the present improvements, weight measurement of each pair of wheels can be definitely obtained or calculated by the degrees of pressure required to elevate a pair of wheels a definte degree and this in relation to a normal level at which the other or remaining pairs or sets of wheels are stationed. The pairs of wheels for which the weight measurement is to be taken are seated upon the weighing or movable rail sections, and resting within the vacity or recess therein bringing in the same slightly below the plane of the track level of the other wheels, and then after registering the pressure necessary to elevate the same to the normal plane of the other wheels and from such degrees of pressure definite weight calculations can be made. If there is any unbalance of weight upon the companion wheels requiring a greater pressure on one side from that of the other, to bring the same to the common level with the other wheels of the locomotive, separate distinct pressure registrations are obtainable through the employment of a pair of gauges for the respective wheels of a pair. The extra weight may be due to additional equipment applied upon the locomotive, and weight additions to accommodate for the unbalance can be readily made if the out-of-balance is not of a proportion sufficient that cognizance thereof must be taken to obtain good engine riding.

The recess or cavity 22 primarily is employed to centralize a pair of wheels upon the weighing apparatus and preferably coaxially with the hydraulically actuated plungers or rams, to avoid in so far as possible any canting of the lifting carriage or otherwise induce undue friction which may unduly increase the lifting pressure. The recesses also serve as a guide to more conveniently and readily place the wheels appropriately upon the carriage, although it is not intended that the apparatus be in any wise limited to that provision. The use thereof permits the rail sections to be maintained normally in an absolute plane with the stationary rails or track to avoid pounding or injury to the rail in moving the wheels on and off of the movable rail section.

In the weighing operation, each pair of wheels of the locomotive are successively brought upon the weighing apparatus, with their order optional, although it is more expeditious to start from one end and proceed in seriatim to the opposite end of the locomotive. After each pair of wheels has been properly positioned upon the weighing carriage the lifting pressure is applied. In the instance illustrated, a fluid pressure is adminstered into the cylinder 12 by means of a hand pump 15, raising the plungers or rams 12 and correspondingly lifting the carriage and its load. The pressure is continued until the indicators or pointers 20 show that the base of the cavity has been elevated, bringing a line horizontally tangent thereto in alignment with the top of the stationary rail or track, whereupon the pressure supply is immediately discontinued; and if one side is short, the pressure supply is effectively individually controlled so that the necessary accommodations can be made for any unbalance or excess in weight carried on one side over that of the other. Each ram accordingly is equipped with its own gauge to render separate readings available, thus joint or separate readings may be taken for each pair of wheels and the pressure measurements can be, if desired, converted into avoirdupois measurements, or the indicators may be provided with various measurement readings to provide for a charting in the most suitable manner for the engine repair men.

The weight of each pair of wheels is obtained with all of the wheels of the locomotive on a common plane or track level, and this also applies respectively for each wheel of a pair, to obtain any relative differential. Therefore, any necessary shifting in weight from one set of wheels to another, and repairs or changes to transfer or equalize the weight can more definitely be made, and thereby eliminate the guess work now prevailing.

In the normal position of the apparatus the carriage may also be sustained by a stationary support to relieve the rail section from carrying the entire load.

With the weight of the locomotive appropriately distributed on the driver truck and trailer wheels, proper and smooth riding on the rails results. Unequal distribution results in considerable damage and wear to various parts of the locomotive as a light-weight engine truck will cause engine to swing. Unequal weight on drivers heats up driving box bearings causing engine wheels to slip. Main wheels should have the proper weight on both wheels for equal tractive power on each side and to avoid severe strains on connector rod. These are only some of the factors encountered through improper distribution of weight on the wheels which interferes materially with the operating efficiency of the locomotive, aside from damaged parts and increased repair costs. The apparatus of the present improvement conveniently permits frequent checking of the wheel carrying weight, effecting a saving in maintenance cost, and permitting of increased tonnage to be handled per locomotive.

Having described the invention, we claim:

1. A hydrostatic weighing apparatus for determining the weight carried by each of a pair of wheels of a railway vehicle with all of the wheels on a common track level or plane, comprising: a stationary length of railway track having a track section movable perpendicularly to the longitudinal plane thereof, said track section of a length to receive a single pair of wheels, fluid operated plungers associated with the movable track section for raising the same to a registering plane with the stationary track, the track section having recesses respectively, for centering the wheels in coaxial registry with the plungers and to lower the point of wheel tread surface bearing on said rail section below the level of the tread surface of the track thereby to obtain the degree of pressure necessary to elevate the load, to bring the point of wheel tread bearing on said track section to the tread level of the track, means for applying fluid under pressure to said plungers, and gauge means connected with said plungers for indicating the pressure administered for elevating said track section and load thereon.

2. A hydrostatic weighing apparatus for selectively determining the weight carried by each of a pair of wheels of a railway vehicle with all of the wheels on a common track level or plane, comprising: a stationary length of railway track having a track section movable perpendicularly to the longitudinal plane thereof, said track section of a length to receive a single pair of wheels, fluid operated plungers associated with the movable track section for raising the same to a registering plane with the stationary track, the track section having recesses, respectively, for centering the wheels in coaxial registry with the plungers and to lower the point of wheel tread surface bearing on said rail section below the level of the tread surface of the track thereby to obtain the degree of pressure necessary to elevate the load, to bring the point of wheel tread bearing on said track section to the tread level of the track, means for selectively applying fluid under pressure to each of said plungers, and gauge means respectively connected with each of said plungers for indicating the pressure administered for elevating said track section and load imposed by each wheel thereon.

3. A hydrostatic weighing apparatus for selectively determining the weight carried by each of a pair of wheels of a railway vehicle with all of the wheels on a common track level or plane, comprising: a stationary length of railway track having a track section movable vertically to the longitudinal plane thereof, said track section of a length to receive a single pair of wheels, means for guiding the track section in a vertical plane, fluid operated plungers associated with the movable track section for raising the same to a registering plane with the stationary track, the track section having recesses, respectively, for centering the wheels in coaxial registry with the plungers and to lower the point of wheel tread surface bearing on said rail section below the level of the tread surface of the track thereby to obtain the degree of pressure necessary to elevate the load, to bring the point of wheel tread bearing on said track section to the tread level of the track, means for selectively applying fluid under pressure to each of said plungers, indicator means for determining the elevation of the movable track section with respect to the stationary track section, and gauge means respectively connected with each of said plungers for indicating the pressure administered for elevating said track section and load imposed by each wheel thereon.

JOHN T. CONNELLY.
FRANK L. HALL.